US008514822B2

(12) United States Patent
Chion et al.

(10) Patent No.: US 8,514,822 B2
(45) Date of Patent: Aug. 20, 2013

(54) EFFICIENT ACKNOWLEDGEMENT MESSAGING IN WIRELESS COMMUNICATIONS

(75) Inventors: Mary Chion, Belle Mead, NJ (US); Sean Cai, San Diego, CA (US); Hongyun Qu, Shenzhen (CN); Cancan Huang, Poway, CA (US)

(73) Assignee: ZTE (USA) Inc., Morristown, NJ (US)

( * ) Notice: Subject to any disclaimer, the term of this patent is extended or adjusted under 35 U.S.C. 154(b) by 767 days.

(21) Appl. No.: 11/763,054

(22) Filed: Jun. 14, 2007

(65) Prior Publication Data

US 2007/0298778 A1 Dec. 27, 2007

Related U.S. Application Data

(60) Provisional application No. 60/813,795, filed on Jun. 14, 2006, provisional application No. 60/893,045, filed on Mar. 5, 2007.

(51) Int. Cl.
*H04W 4/00* (2009.01)

(52) U.S. Cl.
USPC ........................................ 370/338; 455/422.1

(58) Field of Classification Search
USPC ................................. 370/328–350
See application file for complete search history.

(56) References Cited

U.S. PATENT DOCUMENTS

| 5,231,634 | A | * | 7/1993 | Giles et al. | ............ | 370/348 |
| 5,604,771 | A | * | 2/1997 | Quiros | .................. | 375/326 |
| 2002/0146112 | A1 | * | 10/2002 | Larson et al. | ............ | 379/356.01 |
| 2002/0159569 | A1 | * | 10/2002 | Hasegawa | ............ | 379/67.1 |
| 2004/0258092 | A1 | * | 12/2004 | Sugaya | .................. | 370/474 |
| 2005/0122898 | A1 | * | 6/2005 | Jang et al. | ............ | 370/218 |
| 2006/0251097 | A1 | * | 11/2006 | Chapman et al. | ............ | 370/431 |
| 2010/0110985 | A1 | * | 5/2010 | Umesh et al. | .................. | 370/328 |

OTHER PUBLICATIONS

"Medium Access Control" (with reference to wayback machine http://web.archive.org/web/19970620092327/http://www.erg.abdn.ac.uk/users/gorry/eg3561/lan-pages/mac.html). Date: Jun. 1997.*
IEEE 802.16-2004, "IEEE Standard for Local and Metropolitan Area Networks, Part 16: Air Interface for Fixed Broadband Wireless Access Systems", Oct. 1, 2004, 895 pages.
IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006 ,864 pages).

(Continued)

*Primary Examiner* — Kashif Siddiqui
(74) *Attorney, Agent, or Firm* — Perkins Coie LLP

(57) ABSTRACT

Techniques for acknowledging message reception in a wireless OFDM/OFDMA system in clue receiving an unsolicited MAC management message at a subscriber station, operating the subscriber station to generate an acknowledgement (ACK) signal when the subscriber station receives the message from a base station, providing a pre-allocated uplink resource for the subscriber station to transmit the ACK signal to the base station without making a request to the base station for sending the ACK signal and sending the ACK signal consisting of a MAC header transmitted at the pre-allocated uplink source.

16 Claims, 6 Drawing Sheets

(56) References Cited

OTHER PUBLICATIONS

IEEE 802.16j-06/026r2, "Baseline Document for Draft Standard for Local and Metropolitan Area Networks, Part 16: Air Interface for Fixed and Mobile Broadband Wireless Access Systems, Multihop Relay Specification," Feb. 9, 2007, http://grouper.ieee.org/groups/802/16/relay/docs/80216j-06_026r2.pdf (accessed Sep. 17, 2007), 58 pages.

IEEE C802.16j_07/010r2, "IEEE 802.16 Broadband Wireless Access Working Group, Sleep Mode in MR network;" Jan. 16, 2007, http://grouper.ieee.org/groups/802/16/relay/docs/80216j-07_010r2.pdf (accessed Sep. 17, 2007), 7 pages.

* cited by examiner

| Syntax | Size | Notes |
|---|---|---|
| ACK_Message_Format() { | | |
| ACK Message Type | 8 bits | Message type of the message being acknowledging |
| Transaction ID | 16 bits | Transaction ID received in the message being acknowledged. |
| Confirmation Code | 8 bits | Indicate if the action specified by the received message will be carried out.<br>0x00: Accept<br>0x01: Reject<br>Others: Reserved |
| Security Context | | Security Information used to validate the identity of the sender of ACK message. |
| } | | |

FIG. 5

EFFICIENT ACKNOWLEDGEMENT MESSAGING IN WIRELESS COMMUNICATIONS

PRIORITY CLAIMS

This application claims the benefits and priorities of (1) U.S. Provisional Application No. 60/813,795 entitled "Efficient Methods for Providing Message Acknowledgement in OFDMA Wireless Network" and filed Jun. 14, 2006; and (2) U.S. Provisional Application No. 60/893,045 entitled "Efficient Methods for Providing Message Acknowledgement in OFDMA Wireless Network" and filed Mar. 5, 2007.

The disclosures of the above two patent application are incorporated by reference as part of the specification of this application.

BACKGROUND

This application relates to wireless communications in wireless communication systems including systems based on orthogonal frequency division multiplexing (OFDM) and orthogonal frequency division multiple access (OFDMA).

Wireless communication systems use a network of base stations to communicate with wireless devices registered for services in the systems. Each base station emits radio signal that carry data such as voice data and other data content to wireless devices. Such a signal from a base station can include overhead load for various communication management functions, including information to allow a wireless device to identify a cell sector of a base station, to synchronize signaling in time and frequency. Each wireless device processes such information in the overhead load of each received signal prior to processing of the data.

OFDM and OFDMA based communication systems are based on the orthogonality of frequencies of multiple subcarriers and can be implemented to achieve a number of technical advantages for wideband wireless communications, such as resistance to multipath fading and interference. In an OFDM or OFDMA based wireless communication system, the wireless service to a geographic area is provided by dividing the area into a plurality of cells, which can be further divided into two or more cell sectors. The base stations, which conceptually locate at the center of respective cells of their coverage, transmit information to a mobile subscriber station (MSS) via downlink (DL) radio signals sent out from the base stations. A mobile subscriber station is also known as a mobile station (MS) or the wireless station. The mobile stations transmit information to their serving base stations via uplink (UL) radio signals.

The radio coverage of a network of fixed base stations may be limited due to various factors. Various structures may block the radio signals of certain base stations. For example, a tall building may shield a particular area from the radio signal from a base station, thus creating an undesired shadowing. At the edge of a radio cell, the signal strength can be weak and hence can increase the error rate in the wireless communications. One approach to mitigating these and other limitations is to increase the number of base stations in a given service area. In one implementation under this approach, one or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relay station. A subscriber station signals may hop through one or more RSs before reaching a serving base station. The proposed IEEE 802.16j standard provides Multi-hop Relay (MR) modes to use relay stations for enhanced coverage and service to subscribers. A multi-hop relay wireless network under IEEE 802.16j includes MR base stations (MR-BSs) to support Multi-hop Relay modes.

SUMMARY

In one aspect, the wireless communication systems and techniques described in this application provide, among others, a generic efficient acknowledgement for control signaling messages. The acknowledgment mechanism can be used to acknowledge various messages received by one wireless network entity in communications between two wireless network entities such as a Base Station, a subscriber station and a relay station. Due to the unreliability of the over the air radio transmission, a reliable transmission protocol can be used to ensure the delivery of signaling messages. Acknowledgment of message reception is an important part of any reliable transmission protocol. The acknowledgement mechanisms described in this application can be implemented to conserve over the air bandwidth and reduce protocol complexity. A generic acknowledgment message is designed instead of one individual acknowledgment message per signaling message. In another aspect, this application describes efficient uplink feedback mechanisms from subscriber stations to a base station involved in a multicast/broadcast service (MBS) to report channel conditions at the subscriber stations to the base stations in order to select a suitable burst profile in transmitting MBS data by the base station in OFDM and OFDMA wireless communication systems.

This application includes two implementations of acknowledgment messages used by network entities such as subscriber station and relay station to confirm the reception of a particular signaling message. With these mechanisms, the base station can obtain confirmation of message delivery and performs message retransmission if necessary. Moreover, both mechanisms are designed as generic acknowledgement mechanisms for acknowledging various different signaling messages.

The first mechanism is a header based acknowledgment. With this mechanism, the message acknowledgment is carried within a signaling header which use minimum over the air capacity. In one implementation of the header based acknowledgment, when a subscriber station or a relay station receives a signaling message requiring acknowledgment, the subscriber station or the relay station transmits a header which contains the acknowledgement of the received message to the base station. The base station determines possible retransmissions based on the lack of acknowledgment and retransmission timer.

The second mechanism is a message based acknowledgement. In one implementation of this second mechanism, when a subscriber station or a relay station receives a signaling message requiring acknowledgment, the subscriber station or the relay station transmits a generic Acknowledgment message which contains the acknowledgement of the received message to the BS. While this mechanism requires more over the air bandwidth than header based acknowledgement, the message based acknowledgment allows the flexibility of adding other contents to the acknowledgment, such as sender validation content for security protection. The base station determines possible retransmissions based on the lack of acknowledgment and retransmission timer.

Various examples are described. In one example, a method for providing message acknowledgment in a wireless OFDM/OFDMA system includes causing a subscriber station or relay station to generate an acknowledgment (ACK) when receiving a signaling message from base station that requires confirmation; and a header is used to carry the acknowledgment content. When base station sending a message requires acknowledgment, the base station may allocate uplink bandwidth to allow subscriber station or relay station transmit the ACK header without subscriber station or relay station requesting for bandwidth. The base station also determines possible retransmissions based on the lack of acknowledgment and retransmission timer.

In another example, a method for providing message acknowledgment in a wireless OFDM/OFDMA system includes causing a subscriber station or relay station to generate an acknowledgment (ACK) when receiving a signaling message from BS that requires confirmation; and a message is used to carry the acknowledgment content including possible sender validation for security protection. When base station sending a message requires acknowledgment, the base station may predetermine the size of the ACK message and allocate uplink bandwidth to allow subscriber station or relay station transmit the ACK message without subscriber station or relay requesting for bandwidth. The base station also determines possible retransmissions based on the lack of acknowledgment and retransmission timer.

One example of a method for providing a generic acknowledgement of message reception in a wireless OFDM/OFDMA system is described to include operating a subscriber station to generate an acknowledgement (ACK) signal when the subscriber station receives a message from a base station; and providing a pre-allocated uplink resource for the subscriber station to transmit the ACK signal to the base station without making a subscriber station request to the base station for sending the ACK signal. Another example of a method for providing a generic acknowledgement of message reception in a wireless OFDM/OFDMA multi-hop relay system includes operating a relay station to generate an acknowledgement (ACK) signal when the relay station receives a message sent from a base station or a superordinate relay station; and providing a pre-allocated uplink resource for the relay station to transmit the ACK signal to the base station or the superordinate relay station without making a relay station request for sending the ACK signal. Yet another example of a method for providing a generic acknowledgement of message reception in a wireless OFDM/OFDMA system includes operating a subscriber station or relay station to generate an acknowledgement (ACK) signal to acknowledge a plurality of messages received by the subscriber station from a base station, wherein the ACK signal is generated when one of the plurality of messages is received by the subscriber station or relay station.

Communication systems that implement the described techniques are also disclosed. In one example, a system includes base station, subscriber station and access gateway where the described generic acknowledgment mechanisms are implemented by the base station and subscriber station.

In another example, a system includes a base station, relay station, subscriber station and access gateway where the described generic acknowledgment mechanisms are implemented between base station and relay station or base station and subscriber station.

Exemplary implementations and various features of the two acknowledgement mechanisms are now described in greater detail in the attached drawings, the detailed description, and the claims.

BRIEF DESCRIPTION OF THE DRAWINGS

FIG. 5 illustrates one example of message based ACK signaling.

DETAILED DESCRIPTION

One of the characteristic of wireless communications is the fast changing channel condition. Therefore, there tends to be a higher packet loss percentage introduced in comparison with the packet loss in wired communications. A reliable message delivery protocol can be used to ensure the delivery of signaling messages. In one implementation, a reliable deliver protocol can be provided by a receiver transmitting an acknowledgment message upon the reception of a signaling message from a sender. Since many signaling messages may require acknowledgment for the system to function correctly, the presence of many signaling messages can introduce complexity and redundancy when an acknowledgment message is defined per signaling message. Moreover, as system operations and functions increase after the system is first implemented and new signaling messages requiring ACK are added, new acknowledgment messages need to be defined and added. Such a system would not be flexible and may be difficult to be scalable due to the possible limitation on the number of messages a system can support. The techniques described in this application provide a relatively generic acknowledgment message that is designated at a pre-allocated uplink channel for acknowledging reception of a message by a subordinate relay station or a subscriber station. Such acknowledgment messaging techniques can be used to provide flexibility and reduce complexity.

Therefore, a method for making acknowledgment in wireless communications can be implemented to include operating a subscriber station to send a MAC header to a base station to acknowledge reception of a MAC management message sent by the base station. A method for making acknowledgment in multihop relay (MR) wireless communications can include operating a relay station to send a MAC header to a base station or a superordinate relay station which relays information between the base station and the relay station to acknowledge reception of a MAC management message sent by the base station. The MAC management message can include a sleep mode message.

Figure 1:
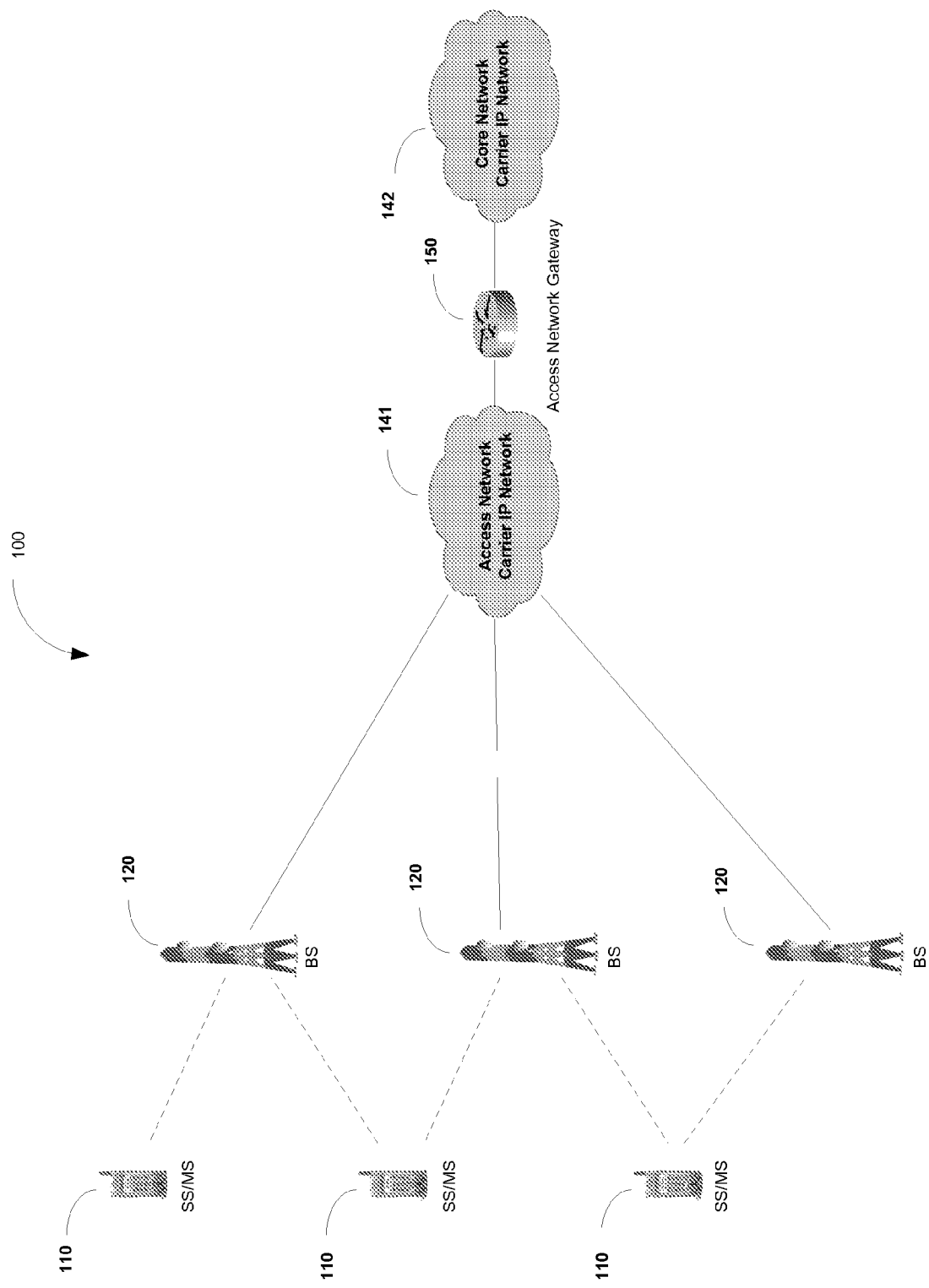
FIG. 1 shows an example of an OFDM/OFDMA wireless communication system.

FIG. 1 illustrates an exemplary OFDM and OFDMA wireless communication system 100. The system 100 may include a network of base stations (BSs) 120 that are spatially distributed in a service area to form a radio access network for wireless subscriber stations (SSs) 110. A SS 110 may be any communication device capable of wirelessly communicating with base stations 120 and may be implemented as a mobile SS or a fixed SS which may be relocated within the system. Examples of a stationary wireless device may include desktop computers and computer servers. Examples of a mobile wireless device (i.e., a MSS) may include mobile wireless phones, Personal Digital Assistants (PDAs), and mobile computers.

A base station 120 in the system 100 is a radio transceiver that is conceptually at a center of a cell and wirelessly communicates with a SS in the cell via downlink radio signals. Each BS 120 may be designed to have directional antennas and to produce two or more directional beams to further divide each cell into different sections.

The BSs 120 are connected to a carrier IP network which carries. As one specific example, the system 100 in FIG. 1 shows a carrier IP network that includes an access network 141 and a core network 142. As illustrated, an access network gateway (AGW) 150 may be used to provide an interface between the access network's carrier IP network 141 and the core network's carrier IP network 142.

IEEE 802.16-2005 defines the air interface standard of an OFDM and OFDMA wireless communication system as described in FIG. 1. In IEEE 802.16-2005, acknowledgment of MAC management messages is designed as one individual acknowledgment message per signaling message. For example, DSA-RSP message is acknowledged by DSA-ACK message and DSC-RSP message is acknowledged by DSC-ACK. Also, a REQ message is confirmed and responded by a RSP message. However, there are some crucial signaling messages may be sent without acknowledgement. As an example, the BS can send both MOB_SLP-RSP and MOB_SCN-RSP unsolicited. With MOB_SLP-RSP message, the BS can activate or de-activate a set of power saving classes and changes their parameters. With MOB_SCN-RSP message, the BS can request the MS to start scanning a set of neighbor BSs and report its scanning result. However, there is no acknowledgement message defined for either of these two unsolicited RSPs messages. After the BS sends MOB_SLP-RSP or MOB_SCN-RSP message, it has no mechanism to find out if the message was received by the MS and the MS' intended action. Since the BS cannot assume the reception of the message or the possible action of the MS, it is almost impossible for the BS to use the unsolicited MOB_SLP-RSP and MOB_SCN-RSP messages to request a change in sleep mode or scanning procedure. Hence, an acknowledgement message is needed for MOB_SLP-RSP and MOB_SCN-RSP.

Also as defined in the IEEE 802.16-2005, when a SS determines to send an acknowledgment message, such as DSA-ACK, the SS needs to request uplink bandwidth allocation by sending a Bandwidth Request ranging code during one of the periodic ranging slots over ranging channel. When the BS receives the bandwidth request ranging code, it allocates uplink resource for the SS to transmit its bandwidth request header. Upon receiving the bandwidth request header, the BS allocates uplink resource for the SS to transmit DSA-ACK message. The bandwidth request procedure introduces a potentially delay in DSA-ACK message delivery and prolongs the connection set up processing with DSA messages. Hence, this acknowledging process can be inefficient.

Figure 2:
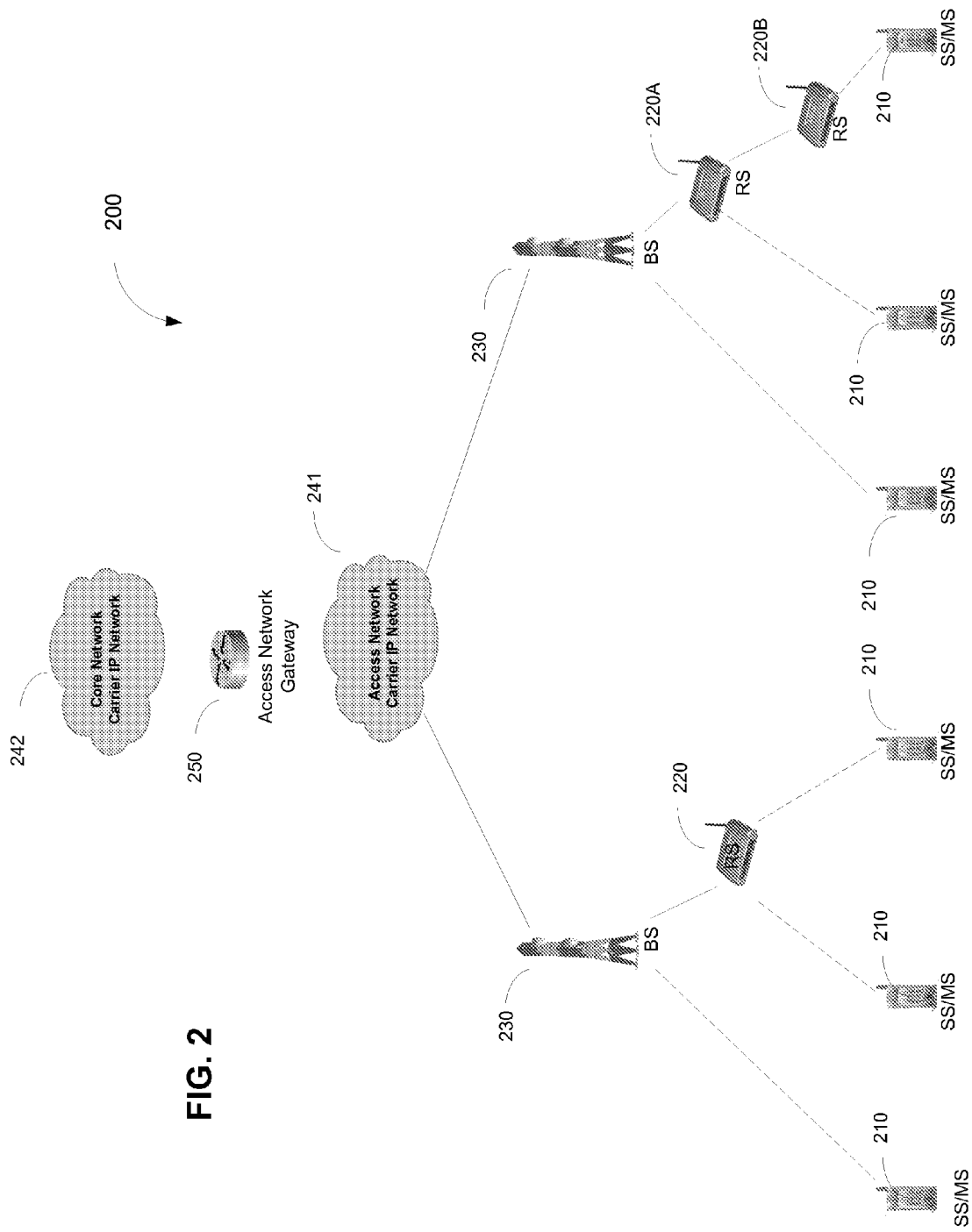
FIG. 2 shows an example of an OFDM/OFDMA wireless communication mobile multi-hop relay system.

FIG. 2 illustrates an exemplary OFDM and OFDMA wireless communication system 200 with mobile multi-hop relay stations. The system 200 includes a network of base stations 230 that are spatially distributed in a service area to form a radio access network for wireless subscriber stations (SSs) 210 and relay stations (RSs) 220. Each SS 210 has the same characteristic and functions as in the wireless system 100. The BS 230 in system 200, in addition to providing direct radio access to SSs 210, can be used to control a network of RSs 220 for coverage extension and capacity increase. A RS 220 may be a fixed transceiver or a mobile transceiver station depending on the specific conditions for deployment. A RS 220 provides radio access to the SSs 210 by relaying data streams from the BS 230. In addition, a RS 220 may provide radio access to other RS 230 by relaying data streams received from BS 230. Each relay station 220 is considered a hop in the communication path from BS 230 to SS 210. A communication path with multiple relay stations 220 is considered a multi-hop relay. Other network elements, such as an access network gateway (AGW) 250 and carrier IP network 241/242, remain the same as defined in system 100.

The multi-hop network in FIG. 2 have superordinate base stations and subordinate base stations. The relay stations 220A and 220B are subordinate to the BS 230 because the BS 230 is connected to the network and acts as the gateway for the relay stations 220A and 220B to the rest of the network. Accordingly, the BS 230 is the superordinate to the relay stations 220A and 220B. In addition, it is possible for relay stations under the control of a superordinate BS to have superordinate and subordinate relationships with one another. For example, the relay station 220B is subordinate to the relay station 220A because 220B communicates to the BS 230 and the rest of the network through the relay station 220A. Hence, the relay station 220A is the superordinate to the relay station 220B. In this context, BSs and relay stations can be classified into superordinate base stations and subordinate base stations based on their relative relationships. As such, the BS 230 is the superordinate base station to relay stations 220A and 220B and the relay station 220A is a subordinate base station to the BS 230 but a superordinate base station to the relay station 220B.

As described in 16j Baseline 802.16j-06/026r2, in MR networks, the sleep mode is centrally controlled by the MR-BS in the presence of centralized or distributed scheduling. Regardless of centralized scheduling or distributed scheduling, all MOB_SLP-REQ messages generated by MSs attached to an RS shall be relayed to the MR-BS, and the MR-BS shall be responsible for generating MOB_SLP-RSP messages, which will relayed by RS, either in response to a MOB_SLP-REQ or unsolicited. With centralized scheduling, MR-BS controls all the radio resource scheduling and allocation. MR-BS approves the MS sleep mode and determines the related parameters of MS sleep mode such as the duration of sleep window and listening window. RS only relays the sleep mode messages, and it does not need to maintain any information of sleep mode MS. With distributed scheduling, RS has the functionality of radio resource scheduling and MAC allocation. MR-BS approves the MS sleep mode and determines the related parameters of MS sleep mode such as the duration of sleep window and listening window. However, to support RS for distributed radio resource scheduling, RS has to know the MS sleep mode information, such as the sleep window, the listening window and so on. Based on this information, RS can perform the correct action to MS on time.

In order to facilitate the centralized management of sleep mode in distributed MR network, correct reception of MS sleep mode information by RS is required. With relatively simple modification to the BS, the MAC header can be sent by RS to MR-BS to provide acknowledgement of the reception of MOB_SLP-RSP.

IEEE 802.16j-06/026r3 defines the air interface standard of an OFDM and OFDMA wireless communication system as described in FIG. 2. In IEEE 802.16j-06/026r3, acknowledgment of MAC management messages is designed as one individual acknowledgment message per signaling message. For example, MS_SCN-INF is acknowledged with MS_SCN-ACK and MS_INFO-DEL is acknowledged with MS_DEL-ACK. Also, a REQ message is confirmed and responded by a RSP message. However, there are some crucial signaling messages that are sent without acknowledgement. As one example, the BS can send SBC-RSP message unsolicited to a RS to update its waiting time for Multicast/Broadcast Service (MBS) data scheduling. The RS relies on receiving the correct waiting time to synchronize its transmission of MBS data with BS and other RSs. Since there is no acknowledgment defined for SBC-RSP message, the BS has no confirmation the reception of SBC-RSP message by the RSs. If the SBC-RSP message is lost during over the air transmission, the RS will be sending out MBS data at the wrong frame without any awareness. In addition, the BS is not informed of loss of the message and thus cannot retransmit the message to correct the error situation. As other examples, Relay_Frame_configuration message, MR_NBR-INFO message and CID_ALLOC-IND message are all crucial BS to RS signaling messages which require acknowledgements. In all those situations, acknowledgement is not defined in IEEE 802.16j-06/026r3.

Figure 3:
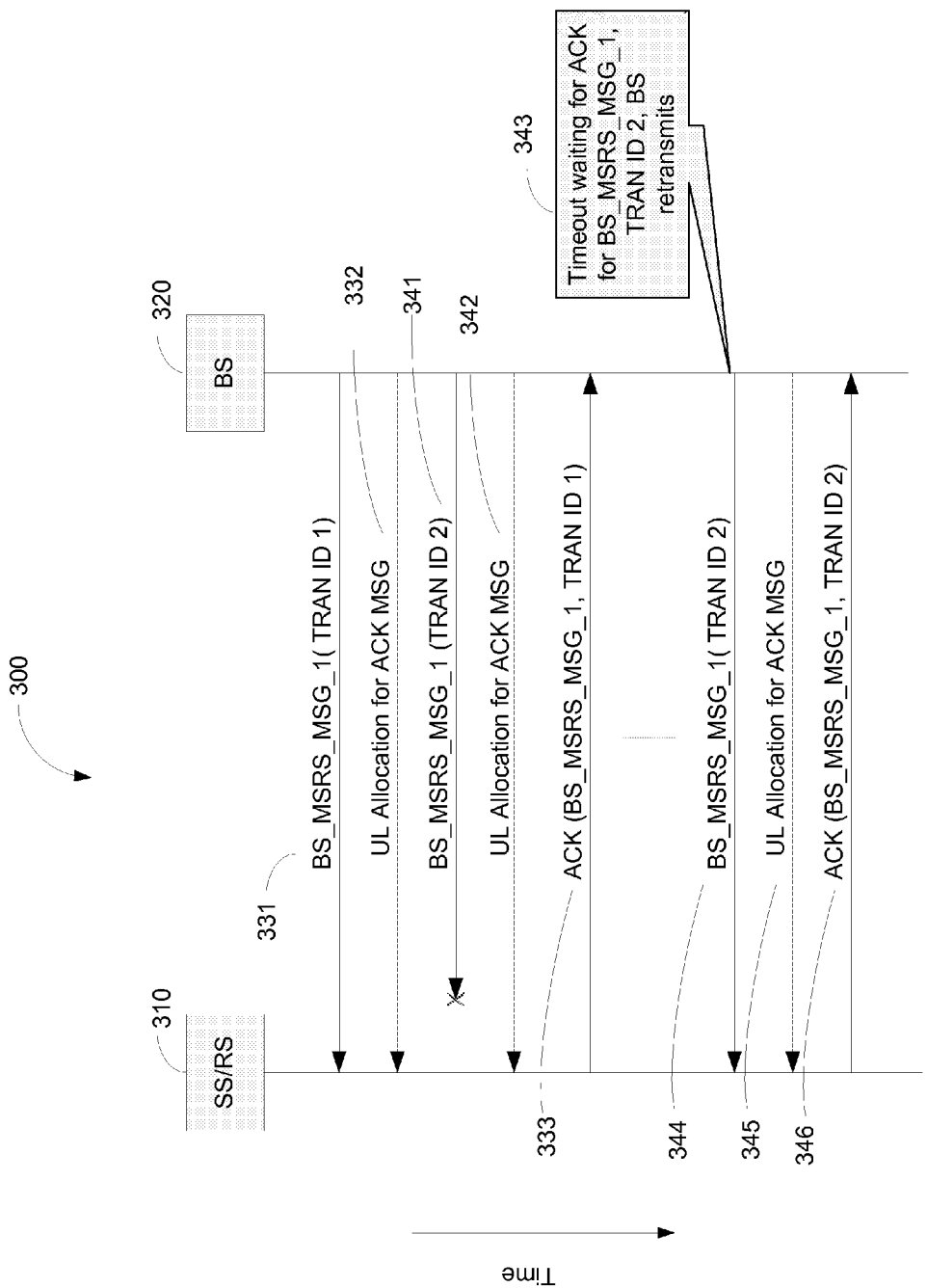
FIG. 3 illustrates examples of message flow with generic ACK signaling between two wireless network entities.

FIG. 3 illustrates examples of message flow with generic ACK signaling between a BS and a SS/RS. In one example as shown in FIG. 3, when a BS 310 sends BS_MSRS_MSG_1 331 to SS/RS 320, the BS 310 may include a transaction ID (1) and ACK required indication in BS_MSRS_MSG_1 331. The transaction ID is used by the MR/RS 320 to differentiate different messages from the BS 310 with the same messages ID, i.e., BS_MSRS_MSG_1 341. If an ACK is required, the BS 310 may optionally allocate uplink resource to the SS/RS 320 to transmit the ACK signaling as illustrated by 332. The uplink resource is pre-allocated to the SS/RS for sending the ACK signaling and therefore the ACK signaling can be sent directly by the BS or RS upon receiving the message from the base station or superordinate BS with a minimum delay. The BS 310 also starts a retransmission timer while waiting for ACK from SS/RS 320. When MR/RS 320 receives BS_MSRS_MSG_1 331, it transmits ACK 333 at the pre-allocated time slot. ACK 333 includes a message ID of the message it is acknowledging, i.e. BS_MSRS_MSG_1, along with the transaction ID contained in the message, i.e., TRAN ID 1. Upon reception of ACK 333, the BS 310 stops the retransmission timer for BS_MSRS_MSG_1 331.

In another example shown in FIG. 3, BS 310 sends BS_MSRS_MSG_1 341 with TRAN ID 2 and pre-allocates uplink resource 342 to SS/RS 320. BS 310 starts a retransmission timer for BS_MSRS_MSG_1 341 while waiting for ACK from SS/RS 320. However, in this example, message BS_MSRS_MSG_1 341 was lost during over the air communication. At time 343, the retransmission timer for BS_MSRS_MSG_1 341 is expired and BS 310 retransmits BS_MSRS_MSG_1 344 with the same transaction ID, i.e. TRAN ID 2, as included in BS_MSRS_MSG_1 341. BS 310 restarts the retransmission timer as it resends BS_MSRS_MSG_1. In addition, BS 310 allocates uplink resource 345 for SS/RS 320. SS/RS sends ACK 346 to BS 310 upon receiving BS_MSRS_MSG_1 344. ACK 346 includes message ID of the message it is acknowledging, i.e. BS_MSRS_MSG_1, along with the transaction ID contained in the message, i.e., TRAN ID 2. Upon reception of ACK 346, the BS 310 stops the retransmission timer for BS_MSRS_MSG_1 344.

ACK signaling shown in FIG. 3 can be implemented in various ways. Two examples of ACK signaling implementations are detailed in the following sections.

Figure 4:
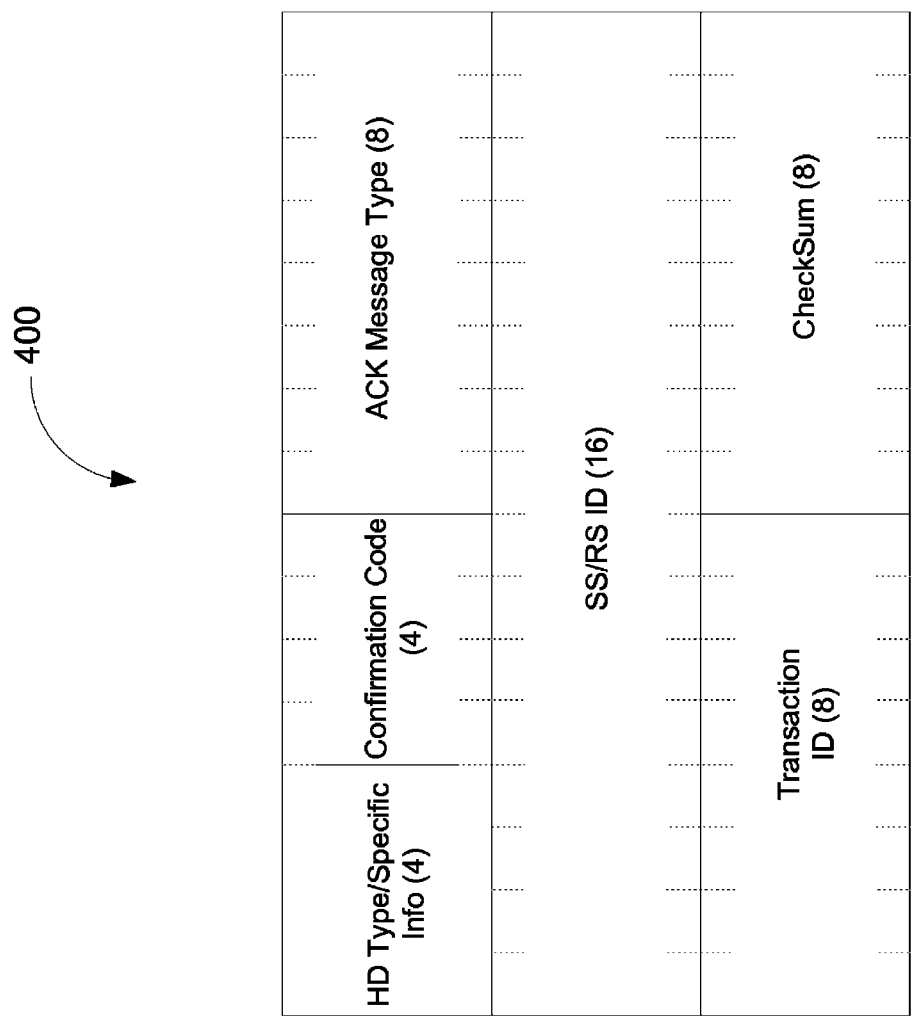
FIG. 4 shows an example of header based ACK signaling.

FIG. 4 shows an example of header based ACK signaling. As defined in many air interface standards, such as IEEE 802.16, the data packet in Medium Access Control (MAC) layer includes a MAC layer header and optional payload. A MAC layer management message is considered as payload. A MAC header can include an identifier of the sender, header checksum and other header related information. The size of a MAC header is generally small and fixed. A MAC header can be used to carry signaling information instead of MAC messages to conserve over the air capacity. In FIG. 4, an example of MAC header is shown with compressed ACK signaling information. The ACK signaling information includes a Message type, a confirmation code and a transaction ID. The message type and the transaction ID are used to uniquely identify the message being acknowledged. The message type is set to the message type of the acknowledged message while the transaction ID is set to the transaction ID retrieved from the acknowledged message. In order to accommodate the limited size of a MAC header, the transaction ID included MAC header can be of a compressed version of, namely, it may only have the least significant bits of the received transaction ID. A confirmation code is included in the MAC header acknowledgement to indicate the SS or RS operation in response to the received message. Exemplary values of confirmation code are Accept and Reject. The MAC ACK message can be a unicast message.

FIG. 5 shows an example of the message based ACK signaling. While message based ACK signaling uses more over the air bandwidth to transmit, it allows additional information to be carried to the BS since there is no stringent message size limitation. As shown in FIG. 5, ACK signaling information in the message includes a Message type, a confirmation code, a transaction ID and security context. The message type and the transaction ID are used to uniquely identify the message being acknowledged. The message type is set to the message type of the acknowledged message while the transaction ID is set to the transaction ID retrieved from the acknowledged message. Confirmation code is used to indicate the SS or RS operation in response to the received message. Exemplary values of confirmation code are Accept and Reject. Security context is used to validate the identity of the SS or RS sending the ACK message. An example of security context is the hashed message authentication code (HMAC) used in IEEE 802.16 standard.

Figure 6:
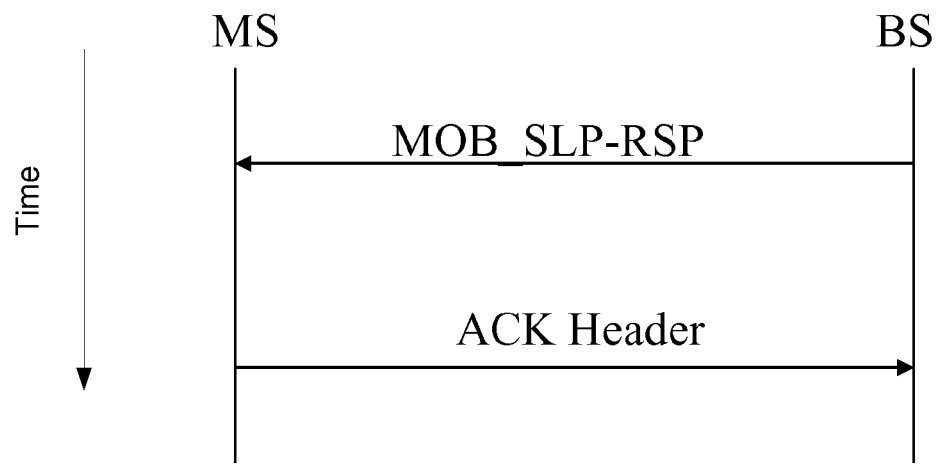
FIG. 6 shows an example flow for messaging and acknowledging between a base station (BS) and a subscriber station (SS).

FIG. 6 shows an example flow for messaging and acknowledging between a BS and a SS. As illustrated, the BS sends MOB-SLP_RSP (Sleep Response message) to activate Power Saving class I. After sending MOB-SLP_RSP message, the BS also allocates uplink bandwidth for the MS to send ACK Header and waits for acknowledgement. The MS receives MOB_SLP-RSP from the BS and sends ACK Header with ACK Message Type set to MOB_SLP-RSP and Confirmation code set to 0b0000 to accept the message. When BS receives ACK header from the MS, it proceeds in activating Power Saving class 1 and change the MS scheduling algorithm with sleep mode activated.

Figure 7:
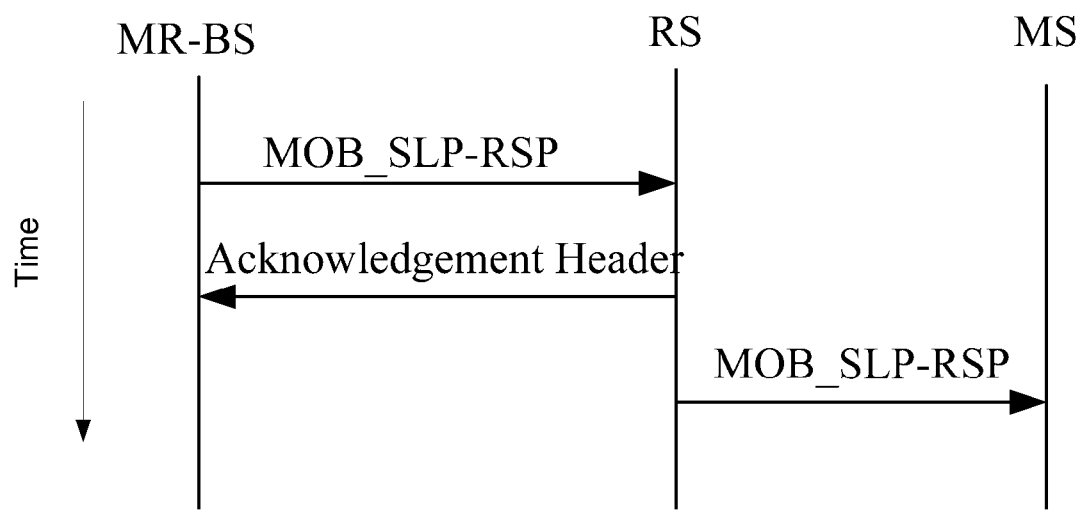
FIG. 7 illustrates an exemplary procedure of the MR-BS during the MS sleep mode.

FIG. 7 illustrates an exemplary procedure of the MR-BS during the MS sleep mode. For an MS/SS attached to the MR-BS through an RS with distributed scheduling, the MS sleep mode can operate as follows. All MOB_SLP-REQ messages generated by MSs attached to an RS shall be relayed to the MR-BS. The MR-BS shall be responsible for generating MOB_SLP-RSP messages, which will be relayed by RS, either in response to a MOB_SLP-REQ or unsolicited. Upon receiving MOB_SLP-RSP, the RS shall process and store the information contained in the message and send an Acknowledgement Header with ACK message Type set to 51 to MR-BS to indicate the reception of MOB_SLP-RSP. The RS shall also relay MOB_SLP-RSP to the MS(s). The MR-BS shall start timer T49 after transmitting a MOB_SLP-RSP to the RS. The timer T49 is the time for MR-BS or RS waiting for Acknowledgement header after sending MOB_SLP-RSP. If T49 timer expires before an Acknowledgement header is received, the MR-BS may retransmit an MOB_SLP-RSP message to the RS. If duplicate MOB_SLP-RSP message is received at the RS, the RS shall send an Acknowledgement Header to MR-BS without further relaying the message.

For multihop relay, after receiving the MOB_SLP-RSP, the RS shall send an Acknowledgement Header to its superordinate RS to indicate the reception of message. The superordinate RS shall retransmit an MOB_SLP-RSP message if it does not receive an Acknowledgement Header before T49 Timer expires. If duplicate MOB_SLP-RSP message is received at the RS, the RS shall send an Acknowledgement Header to its superordinate RS without further relaying to the message.

In implementations, the above described techniques and their variations may be implemented as computer software instructions or firmware instructions. Such instructions may be stored in an article with one or more machine-readable storage media or stored in one or more machine-readable storage devices connected to one or more computers. In operation, the instructions are executed by, e.g., one or more computer processors, to cause the machine to perform the described functions and operations. For example, the techniques for processing the ACK signaling from SS or RS and performing retransmission may be implemented as computer instructions stored in the base stations or a control module that controls base stations. The techniques for generating the ACK signaling via the MAC message or header may be implemented as computer instructions stored in the subscriber stations or relay station.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed.

What is claimed is:

1. A method for acknowledging message reception in a wireless OFDM/OFDMA system, comprising:
   receiving, at a subscriber station, a message having a medium access control layer header and an unsolicited medium access control (MAC) management message as payload;
   operating the subscriber station to generate an acknowledgement (ACK) signal when the subscriber station receives the message from a base station;
   receiving a pre-allocated uplink resource for the subscriber station to transmit the ACK signal to the base station without making a request to the base station for sending the ACK signal; and
   sending the ACK signal consisting of a MAC header transmitted at the pre-allocated uplink resource, the MAC header including acknowledgement information associated with the received message and a message type of the received message.

2. The method as in claim 1, comprising:
   configuring the MAC header to include a transaction ID to identify different versions of received message of the same message type, wherein the transaction ID is set to a transaction ID retrieved from the message being acknowledged.

3. The method as in claim 2, comprising:
   compressing the transaction ID by including only the least significant bits in the MAC header.

4. The method as in claim 1, comprising including a confirmation code in MAC header to indicate an operation of subscriber station in response to the message being acknowledged.

5. A method for acknowledging message reception in a wireless OFDM/OFDMA multi-hop relay system, comprising:
   receiving, at a relay station, a message having a medium access control layer header and an unsolicited medium access control (MAC) management message as payload sent from a base station or a superordinate relay station;
   operating the relay station to generate an acknowledgement (ACK) signal when the relay station receives the message sent from the base station or the superordinate relay station;
   receiving a pre-allocated uplink resource for the relay station to transmit the ACK signal to the base station or the superordinate relay station without making a relay station request for sending the ACK signal; and
   sending the ACK signal consisting of a MAC header transmitted at the pre-allocated uplink resource, the MAC header including acknowledgement information associated with the received message and a message type of the received message.

6. The method as in claim 5, comprising including a transaction ID in the MAC header to identify different versions of received message of the same message type, wherein the transaction ID is set to a transaction ID retrieved from the message being acknowledged.

7. The method as in claim 6, comprising compressing the transaction ID by including only the least significant bits in the MAC header.

8. The method as in claim 5, comprising including a confirmation code in the MAC header to indicate an operation of relay station in response to the message being acknowledged.

9. A method for acknowledging message reception in a wireless OFDM/OFDMA system, comprising:
   receiving, at a subscriber station or a relay station, a plurality of messages having a medium access control layer header and an unsolicited medium access control (MAC) management message as payload;
   operating the subscriber station or the relay station to generate an acknowledgement (ACK) signal to acknowledge the plurality of messages received by the subscriber station from a base station;

providing a pre-allocated uplink resource for the subscriber station or the relay station to transmit the ACK signal to the base station without making a subscriber station request to the base station for sending the ACK signal; and comprising sending the ACK signal consisting of a MAC header transmitted at the pre-allocated uplink resource, the MAC header including acknowledgement information associated with the received message and a message type of the received message.

10. The method as in claim 9, comprising:

operating the base station to, after sending out the message to the subscriber station or relay station, allocate the pre-allocated uplink resource for the subscriber station or relay station to send the ACK signal.

11. The method as in claim 9, comprising including a transaction ID in the MAC header to identify different versions of received message of the same message type, wherein the transaction ID is set to a transaction ID retrieved from the message being acknowledged.

12. The method as in claim 11, comprising compressing the transaction ID by including only the least significant bits in the MAC header.

13. The method as in claim 9, comprising including a confirmation code in the MAC header to indicate an operation of relay station in response to the message being acknowledged.

14. The method as in claim 1, comprising operating the base station to start a timer after sending the message received at the subscriber station, wherein the timer is indicative of a time for the base station to wait for the ACK signal from the subscriber station before retransmitting the message to the subscriber station.

15. The method as in claim 5, comprising operating the relay station to start a timer after sending the message received at the base station or the superordinate relation station, wherein the timer is indicative of a time for the relay station to wait for the ACK signal from the base station or the superordinate relay station before retransmitting the message to the base station or the superordinate relay station.

16. The method as in claim 9, comprising operating the base station to start a timer after sending the message received at the subscriber station or the relay station, wherein the timer is indicative of a time for the base station to wait for the ACK signal from the subscriber station or the relay station before retransmitting the message to the subscriber station or the relay station.

* * * * *